United States Patent
Burr et al.

(10) Patent No.: US 8,261,919 B2
(45) Date of Patent: Sep. 11, 2012

(54) FLUID FILTER MODULE INCLUDING HANDLE

(75) Inventors: Scott T. Burr, Midland, MI (US); Matthew D. Mittag, Midland, MI (US); Matthew J. Turpin, Linden, MI (US); Gavin D. Vogel, Warren, MI (US)

(73) Assignee: Dow Global Technologies LLC, Midland, MI (US)

( * ) Notice: Subject to any disclaimer, the term of this patent is extended or adjusted under 35 U.S.C. 154(b) by 63 days.

(21) Appl. No.: 12/862,872

(22) Filed: Aug. 25, 2010

(65) Prior Publication Data

US 2012/0048796 A1 Mar. 1, 2012

(51) Int. Cl.
- *B01D 35/30* (2006.01)
- *B01D 63/02* (2006.01)
- *B01D 63/06* (2006.01)
- *B01D 35/00* (2006.01)
- *B01D 63/00* (2006.01)

(52) U.S. Cl. ............... 210/470; 210/465; 210/500.23; 210/466; 210/493.2; 210/321.87

(58) Field of Classification Search ............ 210/464, 210/465, 470, 471, 473, 500.23, 446, 493.2, 210/321.87
See application file for complete search history.

(56) References Cited

U.S. PATENT DOCUMENTS

| | | | |
|---|---|---|---|
| 4,609,463 A | 9/1986 | Macevicz et al. | |
| 4,689,191 A | 8/1987 | Beck et al. | |
| 5,055,198 A | 10/1991 | Shettigar | |
| 5,151,180 A | 9/1992 | Giordano et al. | |
| 5,211,846 A * | 5/1993 | Kott et al. | ......... 210/232 |
| 5,328,606 A | 7/1994 | Warren et al. | |
| 5,470,469 A * | 11/1995 | Eckman | ......... 210/321.8 |
| 7,311,208 B2 * | 12/2007 | Brown et al. | ......... 210/438 |
| 2003/0019801 A1 | 1/2003 | Knight | |
| 2003/0038075 A1 | 2/2003 | Akimoto et al. | |
| 2004/0232059 A1 * | 11/2004 | Gustafson et al. | ......... 210/232 |
| 2005/0082216 A1 | 4/2005 | Tump | |
| 2005/0279716 A1 | 12/2005 | Jackman | |
| 2007/0227959 A1 * | 10/2007 | Sinur et al. | ......... 210/232 |
| 2009/0032455 A1 * | 2/2009 | Tada et al. | ......... 210/451 |

FOREIGN PATENT DOCUMENTS

| | | |
|---|---|---|
| DE | 202009011061 | 4/2010 |
| EP | 1524026 | 4/2005 |
| WO | 2006039538 | 4/2006 |
| WO | 2008046037 | 4/2008 |
| WO | 2008110166 | 9/2008 |

OTHER PUBLICATIONS

Ultrafiltration, Meaningful protection for your water treatment processes, Dow UF Module Brochure, Jun. 2008.
Ultrafiltration Modules, Dow UF Module Brochure.

* cited by examiner

*Primary Examiner* — Nam Nguyen
*Assistant Examiner* — Madeline Gonzalez
(74) *Attorney, Agent, or Firm* — Edward W. Black

(57) ABSTRACT

A fluid filter module including an end cap assembly disposed about at least one end of a tubular-shaped housing. The end cap assembly includes a base, fluid port and handle which may optionally comprise an integrally molded structure.

5 Claims, 2 Drawing Sheets

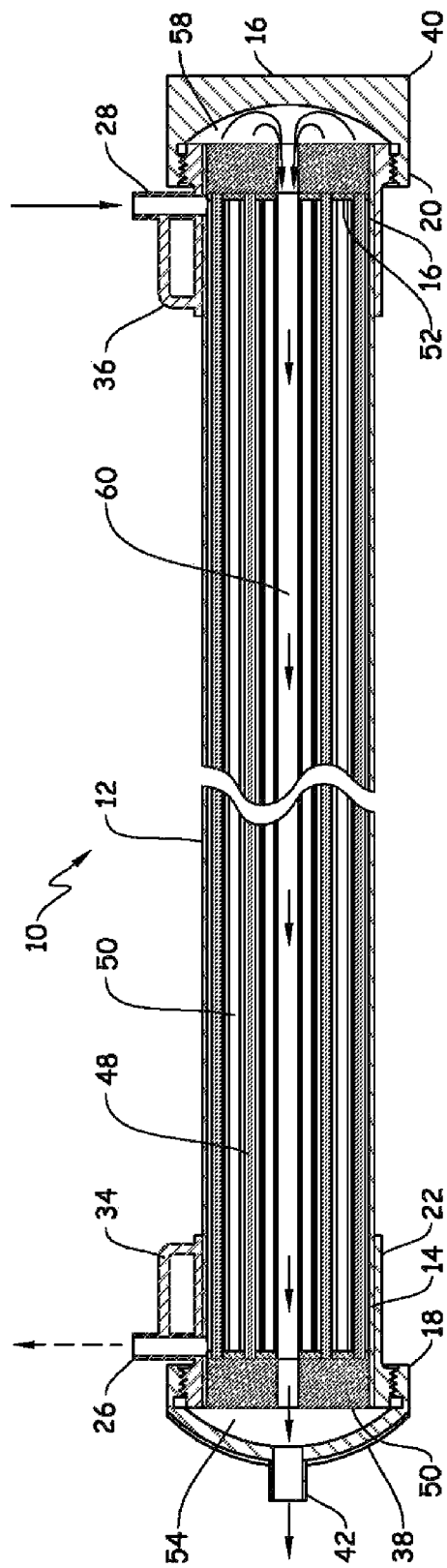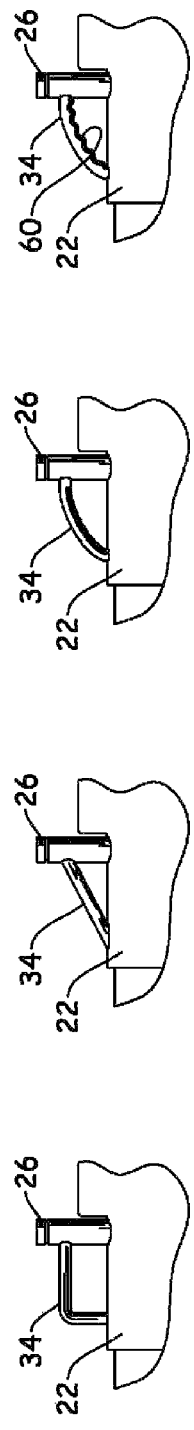
Fig. 2
Fig. 3a  Fig. 3b  Fig. 3c  Fig. 3d

FLUID FILTER MODULE INCLUDING HANDLE

FIELD OF THE INVENTION

The invention is directed toward fluid filter modules and associated component parts.

DESCRIPTION OF THE RELATED ART

Fluid filter modules are used in a wide variety of applications ranging from industrial processing of liquids and gases to residential purification of drinking water. Filter modules typically include a tubular-shaped housing defining an inner chamber with one or more fluid ports located near each end of the housing. In operation, fluid enters the module via a port and passes through a separation medium (e.g. semi-permeable membrane) located within the inner chamber. Fluid passing through the membrane exits the module by way of a separate fluid port, typically located at the opposite end of the module. Various modes of operation are known including dead-end flow and cross-flow modes. Filter modules may also include additional fluid ports or channels including inlets for introducing liquid or gas for cleaning the module. Examples of such modules include DOW™ Ultrafiltration module models: SFP-2860, SFP-2880, SFD-2860 and SFD-2880 available from The Dow Chemical Corporation. These filter modules include semi-permeable hollow fiber membranes design for ultrafiltration-type applications such as the treatment of water. The above-mentioned modules include fluid ports that are molded as an integral part of an end cap assembly mounted on each end of the module housing. Several of the fluid ports extend radially from the end cap assembly, (i.e. extend in a direction perpendicular to the axis defined by the length of the module housing). While facilitating installation, these type of radially extending fluid ports are susceptible to damage (e.g. shearing, cracking, etc.) during transportation and storage.

Filter modules are commonly provided in lengths of 1-2 m and diameters of 0.1-0.25 m. When water filled, larger modules can weigh over 100 kg. Given their configuration and weight, larger filter modules can be exceedingly difficult to manually install—particularly those having lengths over 1 m and weights exceeding 10 kg.

BRIEF SUMMARY OF THE INVENTION

The present invention is directed toward fluid filter modules and associated component parts along with methods for making and using the same. The present filter modules include a tubular housing extending along an axis between two opposing ends which defines an inner chamber. The module further includes at least one end cap assembly comprising: a base disposed concentrically about an end of the housing and a fluid port extending radially outward from the base. The fluid port defines a passageway which is in fluid communication with the inner chamber. The filter module further includes a handle comprising an elongated gripping member extending from the base and defines an opening adapted for handling the module. Additional embodiments are also described including those wherein the elongated gripping member extends from the base to the fluid port, and wherein the base, fluid port and handle comprise an integral molded structure.

BRIEF DESCRIPTION OF THE DRAWINGS

The invention and various embodiments may be better understood by reference to the detailed description and accompanying figures. The figures are provided to facilitate description and are not necessarily to scale. Within these sections, like reference numerals refer to like elements.

FIG. 2 is a partially cut-away, cross-sectional elevational view of the embodiment of FIG. 1.

FIGS. 3-A, B, C and D are partially cut-away elevational views of various embodiments of end cap assemblies.

DETAILED DESCRIPTION OF THE INVENTION

Figure 1:
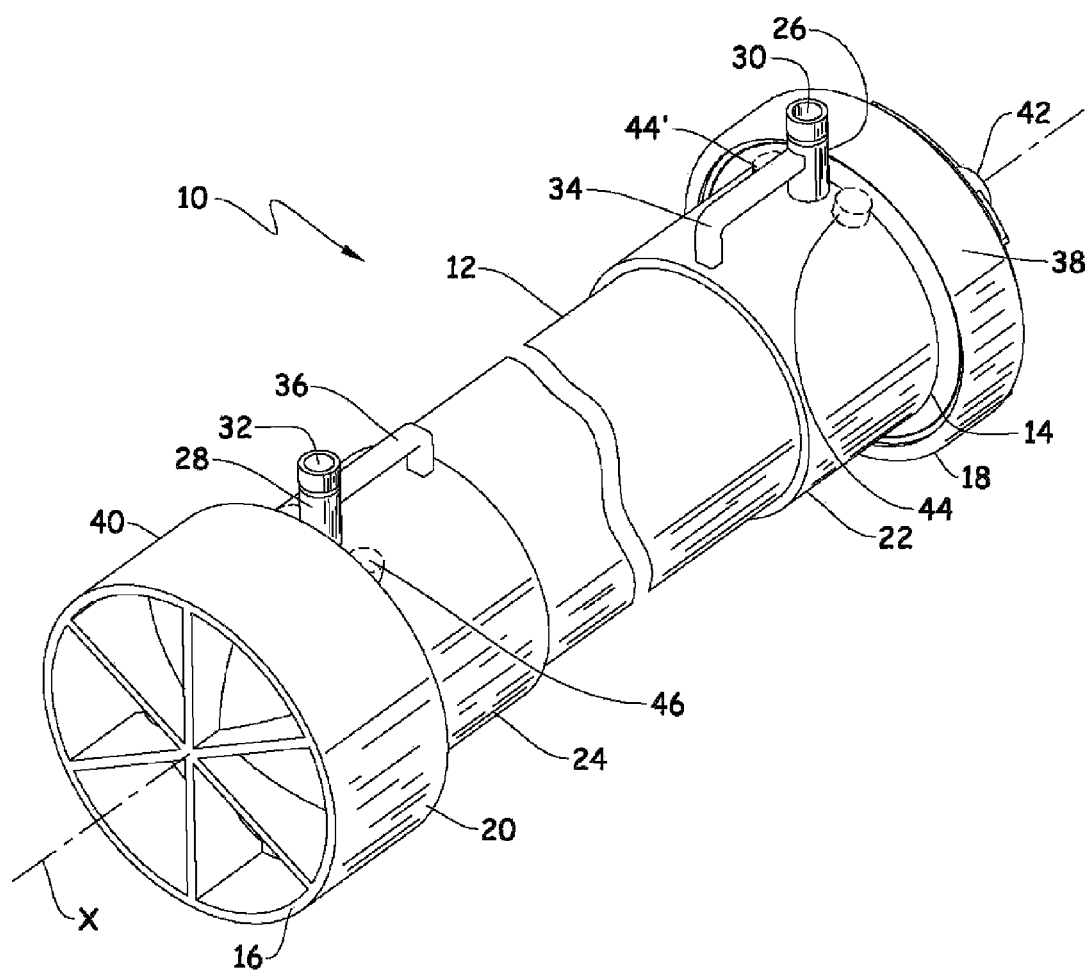
FIG. 1 is a partially cut-away perspective view of a fluid filter module according to one embodiment of the invention.

For purposes of the present description, the term "filter" is intended to describe a module capable of separating constituents based upon a wide variety of separation mechanisms including but not limited to: pore flow, solution-diffusion, ion exchange, adsorption and chelation. The present filter module is applicable for "filtering" a wide range of fluids including both gases and liquids. Examples of common liquid-based separations include organic and aqueous-based feeds.

The present filter module may include a wide variety of separation mediums including membrane-based modules (e.g. spiral wound, hollow fiber, capillary and tubular membrane modules or "elements") and media-based modules (e.g. a cartridge of granular-type material such as ion exchange resin, adsorbent media, e.g. carbon, titanium oxide and the like). Representative semi-permeable membranes include those made from: polysulfones, polyether sulfones, polyvinylidene fluoride, polyamides, polyacrylonitrile, etc. The subject module may be used in a wide range of applications including but not limited to microfiltration (MF), ultrafiltration (UF), nanofiltration (NF) and reverse osmosis (RO) and pervaporation. In preferred embodiments, the module includes at least one semi-permeable membrane located within an inner chamber of the housing. In a preferred sub-set of embodiments, a plurality of semi-permeable hollow fiber membranes are orientated axially within the inner chamber. The ends of the hollow fibers may be sealed from the inner chamber by way of known "potting" techniques wherein one or both ends of the hollow fibers remain open and in fluid communication one or more outer chambers formed within the end cap assembly.

The present filter module preferably comprises a tubular-shaped housing, (e.g. an elongated shell having a length greater than its width), extending along an axis between two opposing ends and defining an inner chamber. In one preferred embodiment, the outer periphery of the filter module is cylindrically-shaped having a circular cross-section. In an alternative embodiment, the housing may have a polygonal cross-section. The housing may be constructed from a wide variety of materials, e.g. plastics, ceramics, metals, etc., however, in one set of preferred embodiments the housing is made from an injection moldable plastic such as polyvinyl chloride (PVC) or acrylonitrile butadiene styrene (ABS).

The filter module further comprises an end cap assembly including a base which is concentrically disposed about an end of the housing. An end cap assembly is preferably located at each end of the module. In preferred embodiments the inner periphery of the base of the end cap assembly includes a matching or complementary configuration with that of the outer periphery of the end of the housing such that the base can be slid, tightly fitted and preferably sealed about the end of the housing. Depending upon the materials of construction, the base may be secured to the housing via mechanical means, e.g. pressure fit, clamps, matching threads, etc., or may be adhered such as by way of ultrasonic welding, spin welding, adhesive, etc., or combinations of such techniques. The end cap assembly further includes a fluid port extending radially outward from the base (e.g. in a direction perpendicular to the axis defined by the length of the housing). The fluid port comprises a raised nozzle-like structure including a passageway which is in fluid communication with the inner chamber of the housing. The end cap assembly may be constructed from a wide variety of materials, e.g. plastics, ceramics, metals, etc., however, in a preferred set of embodiments the housing is made from an injection moldable plastic such as polyvinyl chloride (PVC) or acrylonitrile butadiene styrene (ABS). The end cap assembly may include additional fluid inlets and outlets of various orientations. In a preferred embodiment, the end cap assembly also includes a fluid port (i.e. "channel") extending axially outward from the base.

The filter module further includes a handle comprising an elongated gripping member extending from the base of the end cap assembly. In one embodiment, the elongated gripping member extends from a first position on the base to a second position on the base to form an opening (i.e. closed loop) which is adapted for gripping or otherwise handling the module (e.g. the elongated gripping member is preferably at least 50 mm long but more preferably at least 100 mm long). The elongated gripping member (and corresponding opening) may include a wide variety of shapes, e.g. the elongated gripping member may be "U-shaped" with both ends secured to the base. In a preferred alternative embodiment, the elongated gripping member extends from the base to the fluid port, i.e. the handle, fluid port and base collectively form an opening. In a preferred embodiment, the handle, base and fluid port comprise an integral molded structure, e.g. a single injection molded part. As will be described below in connection with the Figures, the shape of the elongated gripping member and corresponding opening are not particularly limited but are preferably ergonomically dimensioned to facilitate the insertion of fingers or the hand of an operator. For example, in preferred embodiments the length of the elongated gripping member is at least 50 mm and more preferably at least 100 mm. Illustrative structures of elongated gripping members are described below in connection with FIGS. 3A-D. The handle provides a conveniently means for moving the module during transport or installation. Moreover, in a preferred set of embodiments the handle provides structural support to the fluid port which is otherwise susceptible damage. That is, as the fluid port projects radially from the module, it is exposed to potential impact during transport, storage or installation.

With reference to FIG. 1, a representative fluid filter module is generally shown at 10, including a tubular-shaped housing (12) extending along an axis (X) between opposing ends (14, 16) and defining an inner chamber (not shown). An end cap assembly (18, 20) is located at each end (14, 16) of the housing (12). Each end cap assembly (18, 20) comprises an annular base (22, 24) disposed concentrically about each end (14, 16) of the housing (12). The end caps assemblies (18, 20) each comprise a fluid port (26, 28) extending radially outward from the base in a direction perpendicular to the axis (X). The fluid ports (26, 28) are cylindrical and each define a passageway (30, 32) which is in fluid communication with the inner chamber of the housing (12). A handle comprising an L-shaped elongated gripping member (34, 36) extends from the fluid port (26, 28) to the base (22, 24) and defines an opening adapted for handling the module. The length of the elongated gripping member (from base to fluid port) is preferably at least 50 mm and more preferably at least 100 mm. The end cap assemblies (18, 20) further include end caps (38, 40) which are secured to the base (22, 24) e.g. via matching threads, and which define outer chambers (shown in FIG. 2). While end caps (38, 40) may be identical, in the embodiment illustrated in FIG. 1, a "top" end cap (38) includes an outer concave periphery including a centrally located fluid channel (42) extending axially from the base (22), whereas a "bottom" end cap (40) includes a flat planner surface adapted for supporting the module in a vertical orientation.

The end cap assemblies (18, 20) may further include one or more optional bosses (44, 44', 46) (shown in phantom). Each boss (44, 44', 46) comprises a raised side wall or annulus which defines a passageway to the inner chamber of the module (10) along with a top plate. The top plate prevents fluid communication with the inner chamber until such time as the top plate is removed, e.g. by drilling, to form a fluid port. Once the top plate is removed, the resulting fluid port may be connected, e.g. via mating threads, to a fluid source, e.g. pressurized gas, negative pressure, etc. In order to provide flexibility during installation, one or more bosses (44, 44') may be positioned about a base (22, 24) of an end cap assembly (18, 20). The inclusion of multiple bosses allows the module (10) to be interconnected with fluid lines in a variety of different configurations, i.e. the sealed boss located closest to a desired fluid source may be tapped while the other bosses remained sealed. In one preferred embodiment, a plurality of bosses (44, 44') are aligned concentrically about the base (22, 24) along a plane bisecting the axis (X) of the module (10).

FIG. 2 is a partially cut-away perspective view of the embodiment of FIG. 1. A plurality of semi-permeable hollow fibers (48) are orientated along the axis (X) within an inner chamber (50) of the housing (12). The opposing ends of the hollow fibers (48) are sealed from the inner chamber (50) by a mass of potting material (52, 54), (e.g. polyurethane, epoxy, silicone) but open and in fluid communications with outer chambers (56, 58) located within each end cap assembly (18, 20). The outer chambers (56, 58) are in fluid communication with each other by way of a center tube (60) extending centrally along the axis (X) of the module (10). In operation, pressurized feed fluid (e.g. untreated water) enters the inner chamber (50) by way of fluid port (28) and flows along the length of the hollow fibers (48). A portion of the feed fluid passes through semi-permeable membrane (e.g. hollow fibers (48) and travels to the outer chambers (56, 58) of the end cap assemblies (18, 20) where it ultimately exits the module (12) by one or more fluid channels (42), as generally shown by solid arrows. In the illustrated embodiment, permeate (i.e. filtered fluid) of both outer chambers (56, 58) exits the module from a common fluid channel (42). Alternatively, each outer chamber (56, 58) may include a separate fluid channel (not shown). When operating in dead-end mode, the second fluid port (26) is sealed; whereas when operating in cross-flow mode (arrow shown in phantom) the second fluid port (26) is open and provides an outlet for concentrated feed fluid to exit the module. In the illustrated embodiment, both ends of the hollow fibers (48) are in fluid communication with outer chambers (56, 58). In an alternative embodiment, the hollow fibers (48) may be sealed at one end (e.g. end (16)). While described as operating "outside-in" mode (i.e. feed liquid contacting the outside of the hollow fiber membranes), the module may alternatively be operated in "inside-out" mode wherein feed fluid is introduced inside the lumen portion of the hollow fibers. While feed fluid is typically introduced into the module under pressure, the module may alternatively be operated by applying negative pressure to the permeate side of the semi-permeable membrane, or a combination of both positive and negative pressure.

FIGS. 3-A, B, C and D are partially cut-away elevational views of various embodiments of end cap assemblies for use in connection with the subject fluid filter module. FIG. 3-A illustrates an L-shaped elongated gripping member (34) extending from a fluid port (26) to a base (22) of an end cap assembly (18). The gripping member (34), fluid port (26) and base (22) collective form a rectangular opening adapted for receiving the fingers or hand of an operator. The outer edges of the opening may be rounded. FIG. 3-B illustrates a straight shaped elongated gripping member (34) including a triangular shaped opening. FIG. 3-C illustrates a curved shaped elongated gripping member (34). FIG. 3-D illustrates an elongated gripping member (34) including an undulating grip surface (62).

Many embodiments of the invention have been described and in some instances certain embodiments, selections, ranges, constituents, or other features have been characterized as being "preferred". The designation of a feature as being "preferred" should not be interpreted as deeming such features as an essential or critical aspect of the invention. While shown as including an end cap assembly at both ends of the housing, the subject module includes embodiments which include only one end cap assembly. Similarly, while each end cap assembly is shown as including a handle, the subject module includes embodiments which include only one handle.

What is claimed is:

1. A fluid filter module comprising:
    a tubular-shaped housing extending along an axis between two opposing ends and defining an inner chamber,
    at least one semi-permeable membrane located within said inner chamber,
    an end cap assembly comprising:
        a base disposed concentrically about an end of said housing, and
        a fluid port extending radially outward from said base wherein said fluid port defines a passageway in fluid communication with said inner chamber,
    wherein said filter module is characterized by including a handle which comprises an elongated gripping member extending from said base to said fluid port and defining a closed loop adapted for handling said filter module, and wherein said base, fluid port and handle comprise an integral molded structure.

2. The fluid filter module of claim 1 wherein said elongated gripping member comprises a L-shaped structure.

3. The fluid filter module of claim 1 wherein an end cap assembly is located at each end of said housing and wherein at least one end cap assembly further comprises a fluid channel extending axially outward from said base.

4. The fluid filter module of claim 1 wherein an end cap assembly is located at each end of said housing and wherein both end cap assemblies include a handle.

5. The fluid filter module of claim 1 wherein said semi-permeable membrane comprises a plurality of hollow fibers.

* * * * *